(12) United States Patent
Puhala et al.

(10) Patent No.: US 6,852,794 B2
(45) Date of Patent: Feb. 8, 2005

(54) RUBBER COMPOUND CONTAINING A POLYHEDRAL OLIGOMERIC SILSESQUIOXANES

(75) Inventors: Aaron Scott Puhala, Kent, OH (US); David John Zanzig, Uniontown, OH (US); Brian David Holden, Cuyahoga Falls, OH (US); Neil Arthur Maly, Tallmadge, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/214,721

(22) Filed: Aug. 7, 2002

(65) Prior Publication Data

US 2003/0050408 A1 Mar. 13, 2003

Related U.S. Application Data

(60) Provisional application No. 60/318,243, filed on Sep. 27, 2001.

(51) Int. Cl.$^7$ .......................... C08L 83/06; C08L 83/08
(52) U.S. Cl. ...................... 524/588; 524/261; 524/262; 524/267; 524/268; 525/101; 525/102; 525/103; 525/105; 525/106
(58) Field of Search ................................. 524/261, 262, 524/267, 268, 588; 525/101, 102, 103, 105, 106; 528/25, 32, 33, 37

(56) References Cited

U.S. PATENT DOCUMENTS

| | | | | |
|---|---|---|---|---|
| 3,355,399 A | * | 11/1967 | Cekada | 525/100 |
| 5,073,608 A | * | 12/1991 | Ona et al. | 525/477 |
| 5,346,932 A | * | 9/1994 | Takahashi et al. | 523/213 |
| 5,412,053 A | | 5/1995 | Lichtenhan et al. | 528/9 |
| 5,484,867 A | | 1/1996 | Lichtenhan et al. | 528/9 |
| 5,942,638 A | | 8/1999 | Lichtenhan et al. | 556/460 |
| 6,084,015 A | * | 7/2000 | Chino et al. | 524/189 |
| 6,100,417 A | | 8/2000 | Lichtenhan et al. | 556/460 |
| 6,221,943 B1 | * | 4/2001 | Hergenrother et al. | 524/265 |
| 6,225,397 B1 | | 5/2001 | Materne et al. | 524/493 |
| 6,252,030 B1 | | 6/2001 | Zank et al. | 528/31 |
| 6,512,035 B1 | * | 1/2003 | Hergenrother et al. | 524/262 |
| 2002/0052434 A1 | * | 5/2002 | Lichtenhan et al. | 524/261 |

FOREIGN PATENT DOCUMENTS

| | | | | |
|---|---|---|---|---|
| JP | 080534 | 3/2002 | | C08F/36/04 |
| JP | 080682 | 3/2002 | | C08L/47/00 |
| WO | WO 01/72885 A1 | 10/2001 | | C08K/5/00 |

OTHER PUBLICATIONS

Brochure from the website AFRL Propulsion Directorate—Edwards Research Site entitled "Polyhedral Oligomeric Silsesquioxanes" and dated Jun.27, 2001.
Brochure from the website AFRL Propulsion Directorate, POSS entitled Polyhedral Oligomeric Silsesquioxanes and dated Jun. 27, 2001.
Brochure from the website of Sigma–Aldrich entitled "Silsesquioxanes" and dated Jun. 27, 2001.
POSS Chemical Catalog by Hybrid Plastics, 18237 Mt. Baldy Circle, Fountain Valley, California 92708–6117. Published at least as early as May, 2001.
European Search Report for EP 02 10 2272 for corresponding U.S. application.

* cited by examiner

Primary Examiner—Jeffrey B. Robertson
(74) Attorney, Agent, or Firm—John D. DeLong

(57) ABSTRACT

There is disclosed a pneumatic tire having a rubberized component comprising:

(a) 100 parts by weight of at least one rubber containing olefinic unsaturation; and (b) 1 to 110 phr of a polyhedral oligomeric silsesquioxanes.

20 Claims, No Drawings

RUBBER COMPOUND CONTAINING A POLYHEDRAL OLIGOMERIC SILSESQUIOXANES

The Applicants hereby incorporate by reference prior U.S. Provisional Application Ser. No. 60/318,243, filed on Sep. 7, 2001.

BACKGROUND OF THE INVENTION

Reinforcing fillers for rubber typically have relatively large particle sizes, greater than 100 nanometers. Such fillers are commonly inert without any reactive moieties on their surface. Use of these large inert particles do not provide a method for inhibiting polymer chain motion on a molecular level. Therefore, there exists a need for fillers which may permit a means to inhibit polymer chain motion and result in improved tire properties such as treadwear and tear.

SUMMARY OF THE INVENTION

The present invention relates to a pneumatic tire having a rubber component containing a polyhedral oligomeric silsesquioxanes (POSS).

DETAILED DESCRIPTION OF THE INVENTION

There is disclosed a rubber compound containing a polyhedral oligomeric silsesquioxanes (POSS) composition comprising:

(A) 100 parts by weight of at least one rubber containing olefinic unsaturation; and (B) 1 to 110 phr of a polyhedral oligomeric silsesquioxanes.

Polyhedral oligomeric silsesquioxanes (hereinafter referred to as POSS) are a class of compounds with the empirical formula $RSiO_{1.5}$. These compounds derive their name from the one and one-half (1.5) or sesqui-stoichiometry of oxygen bound to silicon. Several structural representations of silsesquioxanes with the empirical formula $RSiO_{1.5}$ are possible, with the two most common representations being a ladder-type structure and a Si—O cage framework. Substituents on silicon can include alcohols, phenols, amines, chlorosilanes, halogens, epoxides, esters, fluoroalkyls, halides, isocyanates, methacrylates and acrylates, molecular silicas, nitriles, norbornenyls, olefins, phosphines, polymers, silanes, silanols, styrenes and thiols.

Many POSS materials are commercially available. For example, Hybrid Plastics commercially offers a number of functionalized POSS that can be used in the present invention. Representative examples of such POSS include alcohol and phenol POSS including TMP diolcyclopentyl-POSS ($C_{45}H_{86}O_{16}Si_9$), trans-cyclohexanediolisobutyl-POSS ($C_{36}H_{78}O_{14}Si_8$) and 1,2-propanediolisobutyl-POSS ($C_{34}H_{76}O_{15}Si_8$). Representative examples of amine-POSS include aminopropylisobutyl-POSS ($C_{31}H_{71}NO_{12}Si_8$), aminopropylisooctyl-POSS ($C_{59}H_{127}NO_{12}Si_8$) and aminoethylaminopropylisobutyl-POSS ($C_{33}H_{76}N_2O_{12}Si_8$). Representative examples of chlorosilane-POSS include monochlorocyclohexyl-POSS ($C_{42}H_{77}ClO_{12}Si_8$), monochlorocyclopentyl-POSS ($C_{35}H_{63}ClO_{12}Si_8$), monochloroisobutyl-POSS ($C_{28}H_{63}ClO_{12}Si_8$), octa(chlorosilylethyl)-POSS ($C_{32}H_{80}Cl_8O_{12}Si_{16}$), octa(dichlorosilylethyl)-POSS ($C_{24}H_{56}Cl_{16}O_{12}Si_{16}$) and octa(trichlorosilylethyl)-POSS ($C_{16}H_{32}Cl_{24}O_{12}Si_{16}$). Representative examples of epoxide-POSS include glycidylisoctyl-POSS ($C_{62}H_{130}O_{14}Si_8$), octaepoxycyclohexyldimethylsilyl-POSS ($C_{80}H_{152}O_{28}Si_{16}$), trisglycidylcyclopentyl-POSS ($C_{59}H_{114}O_{18}Si_{10}$), trisglycidylethyl-POSS ($C_{38}H_{86}O_{18}Si_{10}$), trisglycidylisobutyl-POSS ($C_{52}H_{114}O_{18}Si_{10}$), epoxycyclohexylcyclopentyl-POSS ($C_{43}H_{76}O_{13}Si_8$), epoxycyclohexyldisilanolisobutyl-POSS ($C_{38}H_{84}O_{13}Si_8$), epoxycyclohexylisobutyl-POSS ($C_{36}H_{76}O_{13}Si_8$), epoxycyclohexyl-POSS cage mixtures ($C_{80}H_{130}O_{25}Si_{10}$), epoxypropylcyclopentyl-POSS ($C_{38}H_{68}O_{13}Si_8$), epoxypropylisobutyl-POSS ($C_{31}H_{68}O_{13}Si_8$), glycidylcyclopentyl-POSS ($C_{41}H_{74}O_{14}Si_8$), glycidylethyl-POSS ($C_{20}H_{46}O_{14}Si_8$) and glycidylisobutyl-POSS ($C_{34}H_{74}O_{14}Si_8$). Representative examples of ester-POSS include methylpropionateisobutyl-POSS ($C_{32}H_{70}O_{14}Si_8$), ethylundecanoatecyclopentyl-POSS ($C_{48}H_{88}O_{14}Si_8$) and methylpropionatecyclopentyl-POSS ($C_{39}H_{70}O_{14}Si_8$). Representative examples of fluoroalkyl-POSS include fluoro(3)disilanolcyclopentyl-POSS ($C_{40}H_{75}F_3O_{12}Si_8$), fluoro(13)disilanolcyclopentyl-POSS ($C_{45}H_{75}F_{13}O_{12}Si_8$), fluoro(13)disilanoisobutyl-POSS ($C_{38}H_{75}F_{13}O_{12}Si_8$), methacrylfluoro(3)cyclopentyl-POSS ($C_{48}H_{87}F_3O_{14}Si_9$), methacrylfluoro(13)cyclopentyl-POSS ($C_{53}H_{87}F_{13}O_{14}Si_9$), methacrylfluoro(13)isobutyl-POSS ($C_{46}H_{87}F_{13}O_{14}Si_9$), dodecatrifluoropropyl-POSS ($C_{36}H_{48}F_{36}O_{18}Si_{12}$), trifluorocyclopentyl-POSS ($C_{35}H_{63}F_3O_9Si_7$), trifluoroisobutyl-POSS ($C_{28}H_{63}F_3O_9Si_7$), trifluoropropylisobutyl-POSS ($C_{31}H_{67}F_3O_{12}Si_8$), trisfluoro(3)cyclopentyl-POSS ($C_{50}H_{93}F_9O_{12}Si_{10}$) and trisfluoro(13)cyclopentyl-POSS ($C_{65}H_{93}F_{39}O_{12}Si_{10}$). Representative examples of halide-POSS include chlorophenylisobutyl-POSS ($C_{34}H_{67}ClO_{12}Si_8$), chlorobenzylcyclopentyl-POSS ($C_{42}H_{69}ClO_{12}Si_8$), chlorobenzylisobutyl-POSS ($C_{35}H_{69}ClO_{12}Si_8$), chlorobenzylethylcyclopentyl-POSS ($C_{44}H_{73}ClO_{12}Si_8$), chlorobenzylethylisobutyl-POSS ($C_{37}H_{73}ClO_{12}Si_8$), chlorophenylcyclopentyl-POSS ($C_{41}H_{67}ClO_{12}Si_8$), chloropropylcyclopentyl-POSS ($C_{38}H_{69}ClO_{12}Si_8$) and chloropropylisobutyl-POSS ($C_{31}H_{69}ClO_{12}Si_8$). Representative examples of isocyanate-POSS include isocyanatopropyldimethylsilylcyclopentyl-PC ($C_{41}H_{75}NO_{14}Si_9$) and isocyanatopropyldimethylsilylisobutyl-POSS ($C_{34}H_{75}NO_{14}Si_9$). Representative examples methacrylate-POSS and acrylate-POSS include acryloycyclopentyl-POSS ($C_{41}H_{72}O_{14}Si_8$), methacrylcyclopentyl-POSS ($C_{42}H_{74}O_{14}Si_8$), methacryldimethylsilylcyclopentyl-POSS ($C_{44}H_{80}O_{15}Si_8$), methacryldisilanolcyclopentyl-POSS ($C_{44}H_{82}O_{14}Si_8$), methacryldisilanolisobutyl-POSS ($C_{37}H_{82}O_{14}Si_8$), methacrylethyl-POSS ($C_{12}H_{46}O_{14}Si_8$), methacrylisobutyl-POSS ($C_{35}H_{74}O_{14}Si_8$), methacrylisooctyl-POSS ($C_{63}H_{130}O_{14}Si_8$), methacrylfluoro(3)cyclopentyl-POSS ($C_{48}H_{87}F_3O_{14}Si_9$), methacrylfluoro(13)cyclopentyl-POSS ($C_{53}H_{87}F_{13}O_{14}Si_9$), methacryl-POSS cage mixture ($C_{56}H_{88}O_{28}Si_8$), methacryltrimethylsiloxysiobutyl-POSS ($C_{39}H_{86}O_{14}Si_9$) and methacryltrimethylsiloxycyclopentyl-POSS ($C_{46}H_{86}O_{14}Si_8$). Representative examples of molecular silica-POSS include dodecaphenyl-POSS ($C_{72}H_{60}O_{18}Si_{12}$), dodecaphenyl-POSS ($C_{72}H_{60}O_{18}Si_{12}$), isooctyl-POSS cage mixture ($C_{64}H_{136}O_{12}Si_8$), octacyclohexyl-POSS ($C_{48}H_{88}O_{12}Si_8$), octacyclopentyl-POSS ($C_{40}H_{72}O_{12}Si_8$), octaisobutyl-POSS ($C_{32}H_{72}O_{12}Si_8$), octamethyl-POSS ($C_8H_{24}O_{12}Si_8$), octaphenyl-POSS ($C_{48}H_{40}O_{12}Si_8$), octaTMA-POSS ($C_{32}H_{96}O_{20}Si_8* -60\ H_2O$), dodecatrifluoropropyl-POSS ($C_{36}H_{48}F_{36}O_{18}Si_{12}$), octatrimethylsiloxy-POSS ($C_{24}H_{72}O_{20}Si_{16}$), phenethyl-POSS cage mixture ($C_{64}H_{72}O_{12}Si_8$), phenethylisobutyl- POSS ($C_{36}H_{72}O_{12}Si_8$) and octaammonium-POSS ($C_{24}H_{72}Cl_8N_8O_{12}Si_8$). Representative examples of nitrile-POSS include cyanoethylcyclopentyl-POSS ($C_{38}H_{67}NO_{12}Si_8$), cyanopropylcyclopentyl-POSS ($C_{39}H_{69}NO_{12}Si_8$) and cyanopropyldimethylsilylcyclopentyl-POSS ($C_{41}H_{75}NO_{13}Si_9$). Representative examples of norbornenyl-POSS include norbornenylethylcyclopentyl-POSS ($C_{44}H_{76}O_{12}Si_8$), norbornenylethylisobutyl-POSS ($C_{37}H_{76}O_{12}Si_8$), norbornenylethyldimethylsilylcyclopentyl-POSS ($C_{46}H_{82}O_{13}Si_9$), norbornenylethyldisilanolcyclopentyl-POSS ($C_{46}H_{84}O_{12}Si_8$), norbornenylethyldisilanolisobutyl-POSS ($C_{39}H_{84}O_{12}Si_8$), octanorbornenyl-POSS ($C_{56}H_{72}O_{12}Si_8$) and trisnorbornenylcyclopentyl-POSS ($C_{68}H_{120}O_{12}Si_8$). Representative examples of olefin-POSS include allylcyclopentyl-POSS ($C_{38}H_{68}O_{12}Si_8$), allylisobutyl-POSS ($C_{31}H_{68}O_{12}Si_8$), allyldimethylsilylcyclopentyl-POSS ($C_{40}H_{74}O_{13}Si_9$), cyclohexenylethylcyclopentyl-POSS ($C_{43}H_{76}O_{12}Si_8$), dimethylvinylcyclopentyl-POSS ($C_{39}H_{72}O_{13}Si_9$), diphenylvinylcyclopentyl-POSS ($C_{49}H_{76}O_{13}Si_9$), monovinylcyclopentyl-POSS ($C_{37}H_{66}O_{12}Si_8$), monovinylisobutyl-POSS ($C_{30}H_{66}O_{12}Si_8$), phenylmethylvinylcyclopentyl-POSS ($C_{44}H_{74}O_{13}Si_9$), tris (dimethylvinyl)cyclopentyl-POSS ($C_{47}H_{90}O_{12}Si_{10}$), tris (dimethylvinyl)isobutyl-POSS ($C_{40}H_{90}O_{12}Si_{10}$), trivinylsilylcyclopentyl-POSS ($C_{41}H_{72}O_{13}Si_9$), octavinyl-POSS ($C_{16}H_{24}O_{12}Si_8$) and vinyl-POSS cage mixture ($C_{20}H_{30}O_{15}Si_{10}$). Representative examples of phosphine-POSS includes diphenylphosphinoethylcyclopentyl-POSS ($C_{49}H_{77}O_{12}Si_8$) and diphenylphosphinopropylcyclopentyl-POSS ($C_{50}H_{79}O_{12}Si_8$). Representative examples of polymer-POSS include poly(dimethyl-co-methylhydrido-co-methylpropylPOSS) siloxane (—[$Me_2SiO$][$MeHSiO$] [$Me(C_{38}H_{68}O_{12}Si_8)SiO$]—)$_n$, poly(dimethyl-co-methylvinyl-co-methyletylsiloxyPOSS) siloxane (—[$Me_2SiO$][$MeViSiO$][$Me(C_{39}H_{73}O_{13}Si_9)SiO$]—)$_n$, poly (ethylnorbornenyl-POSS-co-norbornene ($C_{44}H_{76}O_{12}Si_8$)-co-($C_7H_{10}$), poly(ethylsilsesquioxane) ($C_2H_5O_{1.5}Si_8$)$_n$, poly (methylsilsesquioxane) ($CH_3O_{1.5}Si$)$_n$, poly (phenylsilsesquioxane) ($C_6H_5O_{1.5}Si_9$)$_n$, poly (propylmethacrylPOSS-co-methylmethacrylate ($C_{42}H_{74}O_{14}Si_8$)-co-($C_5H_8O_2$), poly(styrylPOSS-co-styrene) ($C_{43}H_{70}O_{12}Si_8$)-co-($C_8H_8$) and poly(vinylsilsesquioxane) ($C_2H_3O_{1.5}Si_8$)$_n$. Representative examples of silane-POSS include dimethylsilanecyclopentyl-POSS ($C_{37}H_{70}O_{13}Si_9$), dimethylsilaneisobutyl-POSS ($C_{30}H_{70}O_{13}$ $Si_9$), monosilaneisobutyl-POSS ($C_{28}H_{64}O_{12}Si_8$), octasilane-POSS ($C_{16}H_{56}O_{20}Si_{16}$), tris(dimethylsilane)cyclopentyl-POSS ($C_{41}H_{84}O_{12}Si_{10}$) and tris(dimethylsilane)isobutyl-POSS ($C_{34}H_{84}O_{12}Si_{10}$). Representative examples of silanol-POSS include cyclohexenyldimethylsilyldisilanolisobutyl-POSS ($C_{38}H_{84}O_{12}Si_8$), dimethylphenyldisilanolcyclopentyl-POSS ($C_{43}H_{76}O_{12}Si_8$), dimethylvinyldisilanolcyclopentyl-POSS ($C_{39}H_{74}O_{12}Si_8$), dimethylvinyldisilanolisobutyl-POSS ($C_{32}H_{74}O_{12}Si_8$), disilanolcyclopentyl-POSS ($C_{40}H_{74}O_{13}Si_8$), disilanolisobutyl-POSS ($C_{32}H_{74}O_{13}Si_8$), fluoro(3) disilanolcyclopentyl-POSS ($C_{40}H_{75}O_{12}Si_8$), fluoro(13) disilanolcyclopentyl-POSS ($C_{45}H_{75}O_{12}Si_8$), fluoro(13) disilanolisobutyl-POSS ($C_{38}H_{75}F_{13}O_{12}Si_8$), methacryldisilanolcyclopentyl-POSS ($C_{44}H_{82}O_{14}Si_8$), methacryldisilanolisobutyl-POSS ($C_{37}H_{82}O_{14}Si_8$), monosilanolcyclopentyl-POSS ($C_{35}H_{64}O_{13}Si_8$), monosilanolisobutyl-POSS ($C_{28}H_{64}O_{13}Si_8$), norbornenylethyldisilanolcyclopentyl-POSS ($C_{46}H_{84}O_{12}Si_8$), norbornenylethyldisilanolisobutyl-POSS ($C_{39}H_{84}O_{12}Si_8$), TMSdisilanolsiobutyl-POSS ($C_{31}H_{74}O_{12}Si_8$), trisilanolcyclopentyl-POSS ($C_{35}H_{66}O_{12}Si_7$), trisilanolethyl-POSS ($C_{14}H_{38}O_{12}Si_7$), trisilanolisobutyl-POSS ($C_{28}H_{66}O_{12}Si_7$), trisilanolisooctyl-POSS ($C_{56}H_{122}O_{12}Si_7$) and trisilanolphenyl-POSS ($C_{42}H_{38}O_{12}Si_7$). Representative examples of styrene-POSS include styrenylisobutyl-POSS ($C_{36}H_{70}O_{12}Si_8$), styrylcyclopentyl-POSS ($C_{43}H_{70}O_{12}Si_8$) and styrylisobutyl-POSS ($C_{36}H_{70}O_{12}Si_8$). Representative examples of thiol-POSS include mercaptopropylisobutyl-POSS ($C_{31}H_{70}O_{12}Si_8$) and mercaptopropylisooctyl-POSS ($C_{59}H_{126}O_{12}Si_8$).

The level of POSS which may be added to the rubber may range from 1 to 110 parts by weight per 100 parts by weight of rubber (phr). Preferably, the level of POSS may range from 3 to 30 phr.

In order to be incorporated into a rubber compound of a tire, the POSS are mixed with rubbers or elastomers containing olefinic unsaturation. The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include a carboxylated rubber, silicon-coupled and tin-coupled star-branched polymers. The preferred rubber or elastomers are polybutadiene and SBR.

In one aspect the rubber to be combined with the POSS is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent When used in the tire tread, the relatively high styrene content of about 30 to about 45 for the E-SBR can be considered beneficial for a purpose of enhancing traction, or skid resistance. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition. The 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

The cis 1,4-polybutadiene rubber (BR) is considered to be beneficial for a purpose of enhancing the tire tread's wear, or treadwear. Such BR can be prepared, for example, by organic solution polymerization of 1,3-butadiene. The BR may be conveniently characterized, for example, by having at least a 90 percent cis 1,4-content.

Various POSS discussed above have various different functional groups. Of particular interest are those POSS which have hydroxyl or amine functionality available. In such instances, it is believed to be desirable to use as the rubber, in whole or in part, a functionalized rubber for direct reaction with the functional group of the POSS. One particular type of rubber that would be appropriate is a carboxylated rubber such as the carboxylated forms of SBR, PBD and polyisoprene.

The term "phr" as used herein, and according to conventional practice, refers to "parts by weight of a respective material per 100 parts by weight of rubber, or elastomer."

In addition to the POSS and elastomer in the rubberized component of the tire, conventional fillers may be also present. The amount of such conventional fillers may range from 10 to 250 phr. Preferably, the filler is present in an amount ranging from 20 to 100 phr.

The commonly employed siliceous pigments which may be used in the rubber compound include conventional pyrogenic and precipitated siliceous pigments (silica), although precipitated silicas are preferred. The conventional siliceous pigments preferably employed in this invention are precipitated silicas such as, for example, those obtained by the acidification of a soluble silicate, e.g., sodium silicate.

Such conventional silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The conventional silica may also be typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

Commonly employed carbon blacks can be used as a conventional filler. Representative examples of such carbon blacks include N110, N121, N220, N231, N234, N242, N293, N299, S315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP No. ranging from 34 to 150 cm$^3$/100 g.

It may be preferred to have the rubber composition for use in the tire component to additionally contain a conventional sulfur containing organosilicon compound. Examples of suitable sulfur containing organosilicon compounds are of the formula:

$$Z\text{-Alk-}S_n\text{-Alk-}Z \qquad (I)$$

in which Z is selected from the group consisting of

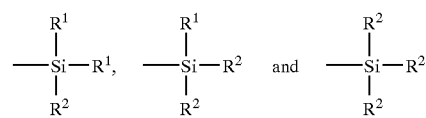

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis(triethoxysilylpropyl)disulfide, 3,3'-bis(triethoxysilylpropyl)tetrasulfide, 3,3'-bis(triethoxysilylpropyl)octasulfide, 3,3'-bis(trimethoxysilylpropyl)tetrasulfide, 2,2'-bis (triethoxysilylethyl)tetrasulfide, 3,3'-bis (trimethoxysilylpropyl)trisulfide, 3,3'-bis (triethoxysilylpropyl)trisulfide, 3,3'-bis (tributoxysilylpropyl)disulfide, 3,3'-bis (trimethoxysilylpropyl)hexasulfide, 3,3'-bis (trimethoxysilylpropyl)octasulfide, 3,3'-bis (trioctoxysilylpropyl)tetrasulfide, 3,3'-bis (trihexoxysilylpropyl)disulfide, 3,3'-bis(tri-2"-ethylhexoxysilylpropyl)trisulfide, 3,3'-bis (triisooctoxysilylpropyl)tetrasulfide, 3,3'-bis(tri-t-butoxysilylpropyl)disulfide, 2,2'-bis(methoxy diethoxy silyl ethyl)tetrasulfide, 2,2'-bis(tripropoxysilylethyl)pentasulfide, 3,3'-bis(tricyclonexoxysilylpropyl)tetrasulfide, 3,3'-bis (tricyclopentoxysilylpropyl)trisulfide, 2,2'-bis(tri-2"-methylcyclohexoxysilylethyl)tetrasulfide, bis (trimethoxysilylmethyl)tetrasulfide, 3-methoxy ethoxy propoxysilyl 3'-diethoxybutoxy-silylpropyltetrasulfide, 2,2'-bis(dimethyl methoxysilylethyl)disulfide, 2,2'-bis(dimethyl sec.butoxysilylethyl)trisulfide, 3,3'-bis(methyl butylethoxysilylpropyl)tetrasulfide, 3,3'-bis(di t-butylmethoxysilylpropyl)tetrasulfide, 2,2'-bis(phenyl methyl methoxysilylethyl)trisulfide, 3,3'-bis(diphenyl isopropoxysilylpropyl)tetrasulfide, 3,3'-bis(diphenyl cyclohexoxysilylpropyl)disulfide, 3,3'-bis(dimethyl ethylmercaptosilylpropyl)tetrasulfide, 2,2'-bis(methyl dimethoxysilylethyl)trisulfide, 2,2'-bis(methyl ethoxypropoxysilylethyl)tetrasulfide, 3,3'-bis(diethyl methoxysilylpropyl)tetrasulfide, 3,3'-bis(ethyl di-sec. butoxysilylpropyl)disulfide, 3,3'-bis(propyl diethoxysilylpropyl)disulfide, 3,3'-bis(butyl dimethoxysilylpropyl)trisulfide, 3,3'-bis(phenyl dimethoxysilylpropyl)tetrasulfide, 3-phenyl ethoxybutoxysilyl 3'-trimethoxysilylpropyl tetrasulfide, 4,4'-bis (trimethoxysilylbutyl)tetrasulfide, 6,6'-bis (triethoxysilylhexyl)tetrasulfide, 12,12'-bis (triisopropoxysilyl dodecyl)disulfide, 18,18'-bis (trimethoxysilyloctadecyl)tetrasulfide, 18,18'-bis (tripropoxysilyloctadecenyl)tetrasulfide, 4,4'-bis (trimethoxysilyl-buten-2-yl)tetrasulfide, 4,4'-bis (trimethoxysilylcyclohexylene)tetrasulfide, 5,5'-bis (dimethoxymethylsilylpentyl)trisulfide, 3,3'-bis (trimethoxysilyl-2-methylpropyl)tetrasulfide, 3,3'-bis (dimethoxyphenylsilyl-2-methylpropyl)disulfide.

The preferred sulfur containing organosilicon compounds are the 3,3'-bis(trimethoxy or triethoxy silylpropyl)sulfides. The most preferred compounds are 3,3'-bis (triethoxysilylpropyl)disulfide and 3,3'-bis (triethoxysilylpropyl)tetrasulfide. Therefore as to formula I, preferably Z is

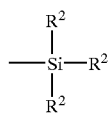

where $R^2$ is an alkoxy of 2 to 4 carbon atoms, with 2 carbon atoms being particularly preferred; alk is a divalent hydrocarbon of 2 to 4 carbon atoms with 3 carbon atoms being particularly preferred; and n is an integer of from 2 to 5 with 2 and 4 being particularly preferred.

The amount of the sulfur containing organosilicon compound of formula I in a rubber composition will vary depending on the level of other additives that are used. Generally speaking, the amount of the compound of formula I will range from 0.5 to 20 phr. Preferably, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Preferably, the sulfur vulcanizing agent is elemental sulfur. The sulfur vulcanizing agent may be used in an amount ranging from 0.5 to 8 phr, with a range of from 1.5 to 6 phr being preferred. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, naphthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can be accomplished by methods known to those having skill in the rubber mixing art. For example the ingredients are typically mixed in at least two stages, namely at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage (s). The rubber and POSS are mixed in one or more non-productive mix stages. The terms "non-productive" and "productive" mix stages are well known to those having skill in the rubber mixing art. The POSS may be added as a separate ingredient or in the form of a masterbatch. The rubber composition containing the POSS, as well as the sulfur-containing organosilicon compound, if used, may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

One feature of the many POSS is their solubility in organic solvents. This feature offers the opportunity to incorporate such POSS into the elastomers via a number of ways aside from mechanical working in a mixer or extruder. For example, it is contemplated that one can disperse or dissolve the POSS in a polymer cement (elastomer solubilized in an organic solvent) with mixing and removal of the solvent to yield a uniformly dispersed POSS in the elastomer. In accordance with another embodiment, one can solubilize the POSS in the organic solvent along with the monomer or monomers for subsequent solution polymerization. Under this embodiment, the monomers polymerize to form the elastomer in the presence of POSS.

The rubber composition containing the rubber and POSS may be incorporated in a variety of rubber components of the tire. For example, the rubber component may be a tread (including tread cap and tread base), sidewall, apex, chafer, sidewall insert, wirecoat or innerliner. Preferably, the compound is a tread.

The pneumatic tire of the present invention may be a race tire, passenger tire, aircraft tire, agricultural, earthmover, off-the-road, truck tire and the like. Preferably, the tire is a passenger or truck tire. The tire may also be a radial or bias, with a radial being preferred.

Vulcanization of the pneumatic tire of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having a rubber component made from a rubber composition comprising
   (A) 100 parts by weight of at least one rubber containing olefinic unsaturation, said at least one rubber comprising a carboxylated rubber selected from the group consisting of carboxylated styrene butadiene rubber, carboxylated polybutadiene, and carboxylated polyisoprene; and
   (B) 1 to 110 phr of a polyhedral oligomeric silsesquioxanes having a reactive functionality selected from the group consisting of alcohol, phenol, and amine functionalities.

2. The pneumatic tire of claim 1 wherein said at least one rubber containing olefinic unsaturation further comprises a rubber selected from the group consisting of natural rubber, neoprene, polyisoprene, butyl rubber, halobutyl rubber, halogenated copolymer of isobutylene and para-methyl styrene, polybutadiene, styrene-butadiene copolymer, styrene/isoprene/butadiene rubber, methyl methacrylate-butadiene copolymer, isoprene-styrene copolymer, methyl methacrylate-isoprene copolymer, acrylonitrile-isoprene copolymer, acrylonitrile-butadiene copolymer, hydrogenated rubber, EPDM, silicon-coupled star-branched polymers, tin-coupled star-branched polymers and mixtures thereof.

3. The pneumatic tire of claim 1 wherein said polyhedral oligomeric silsesquioxanes contain an alcohol or phenol functionally active moiety and is selected from the group consisting of TMP diolcyclopentyl-POSS, TMPdiolisobutyl-POSS, trans-cyclohexanediolisobutyl-POSS and 1,2-propanediolisobutyl-POSS.

4. The pneumatic tire of claim 1 wherein said polyhedral oligomeric silsesquioxanes contain an amine functionally active moiety and is selected from the group consisting of aminopropylisobutyl-POSS, aminopropylisooctyl-POSS and aminoethylaminopropylisobutyl-POSS.

5. The pneumatic tire of claim 1, wherein said composition further comprises from 10 to 250 phr of a filler selected from carbon black and silica.

6. The pneumatic tire of claim 1, wherein said composition further comprises from 20 to 100 phr of a filler selected from carbon black and silica.

7. The pneumatic tire of claim 5, wherein said composition further comprises from 0.5 to 20 phr of a sulfur containing organosilicon compound of the formula $$Z\text{-Alk-}S_n\text{-Alk-}Z \qquad (I)$$

in which Z is selected from the group consisting of

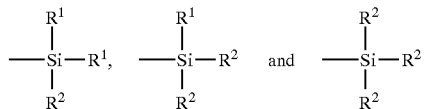

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

8. The pneumatic tire of claim 1, wherein said rubber composition exclusive of curatives is subjected to a non-productive thermomechanical mixing step comprising mechanical working in a mixer or extruder for from 1 to 20 minutes to produce a rubber temperature between 140° C. and 190° C.

9. The pneumatic tire of claim 1 wherein said tire is selected from the group consisting of race tires, passenger tires, aircraft tires, agricultural, earthmover, off-the-road or truck tires.

10. The pneumatic tire of claim 1 wherein said tire is a radial.

11. A pneumatic tire of claim 1 wherein said rubber component is selected from the group consisting of tread, sidewall, apex, chafer, sidewall insert, wirecoat or innerliner.

12. The pneumatic tire of claim 1 wherein said component is a tread.

13. A pneumatic tire having a rubber component made from a rubber composition comprising
(A) 100 parts by weight of at least one rubber containing olefinic unsaturation, said at least one rubber comprising a carboxylated rubber selected from the group consisting of carboxylated styrene butadiene rubber, carboxylated polybutadiene, and carboxylated polyisoprene;
(B) 1 to 110 phr of a polyhedral oligomeric silsesquioxanes having a reactive functionality selected from the group consisting of alcohol, phenol, and amine functionalities;
(C) 20 to 250 phr of a filler selected from silica and carbon black; and
(D) 0.5 to 20phr of a sulfur containing organosilicon compound of the formula

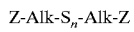  (I)

in which Z is selected from the group consisting of

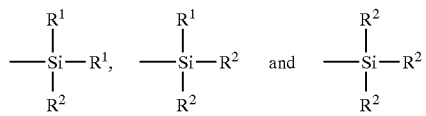

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

14. The pneumatic tire of claim 13 wherein said polyhedral oligomeric silsesquioxanes contain an alcohol or phenol functionally active moiety and is selected from the group consisting of TMP diolcyclopentyl-POSS, TMPdiolisobutyl-POSS, trans-cyclohexanediolisobutyl-POSS and 1,2-propanediolisobutyl-POSS.

15. The pneumatic tire of claim 13 wherein said polyhedral oligomeric silsesquioxanes contain an amine functionally active moiety and is selected from the group consisting of aminopropylisobutyl-POSS, aminopropylisooctyl-POSS and aminoethylaminopropylisobutyl-POSS.

16. The pneumatic tire of claim 13 wherein said at least one rubber containing olefinic unsaturation further comprises a rubber selected from the group consisting of-natural rubber, neoprene, polyisoprene, butyl rubber, halobutyl rubber, halogenated copolymer of isobutylene and para-methyl styrene, polybutadiene, styrene-butadiene copolymer, styrene/isoprene/butadiene rubber, methyl methacrylate-butadiene copolymer, isoprene-styrene copolymer, methyl methacrylate-isoprene copolymer, acrylonitrile-isoprene copolymer, acrylonitrile-butadiene copolymer, hydrogenated rubber, EPDM, silicon-coupled star-branched polymers, tin-coupled star-branched polymers and mixtures thereof.

17. The pneumatic tire of claim 13, wherein said rubber composition exclusive of curatives is subjected to a non-productive thermomechanical mixing step comprising mechanical working in a mixer or extruder for from 1 to 20 minutes to produce a rubber temperature between 140° C. and 190° C.

18. The pneumatic tire of claim 13, wherein said composition comprises from 20 to 100 phr of a filler selected from carbon black and silica.

19. The pneumatic tire of claim 1 wherein said polyhedral oligomeric silsesquioxanes is present in an amount from 3 to 30 phr.

20. The pneumatic tire of claim 13 wherein said polyhedral oligomeric silsesquioxanes is present in an amount from 3 to 30 phr.

* * * * *